US008774724B2

(12) United States Patent
Maric et al.

(10) Patent No.: US 8,774,724 B2
(45) Date of Patent: Jul. 8, 2014

(54) SYSTEMS AND METHODS OF BACKHAUL OPTIMIZATION

(75) Inventors: Ivana Maric, Sunnyvale, CA (US); Bojan Bostjancic, Palo Alto, CA (US); Andrea Goldsmith, Menlo Park, CA (US)

(73) Assignee: Aviat U.S., Inc., Santa Clara, CA (US)

( * ) Notice: Subject to any disclaimer, the term of this patent is extended or adjusted under 35 U.S.C. 154(b) by 102 days.

(21) Appl. No.: 13/299,342

(22) Filed: Nov. 17, 2011

(65) Prior Publication Data

US 2012/0231806 A1  Sep. 13, 2012

Related U.S. Application Data

(60) Provisional application No. 61/414,860, filed on Nov. 17, 2010.

(51) Int. Cl.
*H04B 1/00* (2006.01)
*H04B 15/00* (2006.01)
*H04W 72/00* (2009.01)

(52) U.S. Cl.
USPC ............................ 455/63.2; 455/453; 709/228

(58) Field of Classification Search
CPC .................... H04W 16/12; G07C 2009/00793; H04J 11/004
USPC .................................. 455/63.2, 453; 709/228
See application file for complete search history.

(56) References Cited

U.S. PATENT DOCUMENTS

| | | | |
|---|---|---|---|
| 2006/0064497 A1* | 3/2006 | Bejerano et al. | 709/228 |
| 2007/0111665 A1* | 5/2007 | Klein et al. | 455/63.2 |
| 2007/0142064 A1 | 6/2007 | Gutowski | |
| 2008/0025317 A1 | 1/2008 | Pecen et al. | |
| 2008/0186918 A1 | 8/2008 | Tinnakornsrisuphap et al. | |
| 2008/0232256 A1 | 9/2008 | Douglas et al. | |
| 2010/0136998 A1* | 6/2010 | Lott et al. | 455/453 |

OTHER PUBLICATIONS

International Application No. PCT/US2011/061284, International Search Report and Written Opinion mailed Mar. 22, 2012.

* cited by examiner

*Primary Examiner* — William D Cumming
(74) *Attorney, Agent, or Firm* — Sheppard, Mullin, Richter & Hampton LLP

(57) ABSTRACT

Various embodiments provide for systems and methods of backhaul optimization. An exemplary system comprises a plurality of low power cells and a connector node. The connector node may be in communication with the plurality of low power cells. The connector node may be configured to receive demands from each of the plurality of low power cells. Each of the demands may indicate a demand at a predetermined time. The connector node may be further configured to determine a rate for each of the plurality of low power cells based on the demands of each of the low power cells and the assigned rate of the other of the plurality of low power cells. The connector node may be further configured to allocate capacity based on the determined rates.

21 Claims, 6 Drawing Sheets

SYSTEMS AND METHODS OF BACKHAUL OPTIMIZATION

CROSS-REFERENCE TO RELATED APPLICATIONS

This application claims priority from U.S. Provisional Application Ser. No. 61/414,860 filed Nov. 17, 2010, which is hereby incorporated by reference.

FIELD OF THE INVENTION(S)

The present invention(s) relate to backhaul systems, and more particularly, some embodiments relate to systems and methods for backhaul optimization.

DESCRIPTION OF THE RELATED ART

In wireless cellular systems, the radio access network is often a bottleneck to achieving high capacity. This bottleneck is often a result of impairments of the wireless medium. In comparison to radio access network capacity, backhaul capacity is typically large. Further, dedicated backhaul links are assumed to provide the needed capacity to support backhaul requirements.

The new trend to improve cellular coverage (especially indoors) and network capacity is to populate a network with low power base stations, thus adding cells of smaller radius referred to as "picocells." Unfortunately, the increased density of picocells when compared to a macrocell network raises a number of design issues. In particular, large number of picocells typically require automation of the operation and optimization of transmit parameters. This leads to the concept of self-organizing networks (SONs). Furthermore, the presence of a large number of picocells impact the backhaul. For example, providing a dedicated backhaul (such as fiber) to each picocell leads to a large deployment cost. In such settings, the idea of wireless backhaul that connects multiple picocells becomes very attractive.

While this approach enables a more efficient way of providing backhaul to SONs and can do so at high spectral efficiency, backhaul communication is performed over a wireless channel shared among multiple picocells. The channel is typically non-line-of-sight or near-line-of-sight. Thus, depending on the channel quality, the backhaul capacity per picocell may match or even fall below the total throughput provided by that picocell to its mobile users. Therefore, unlike backhaul in the macro cellular networks, in these settings the backhaul becomes constrained. Overall, the differences of the considered backhaul from the dedicated backhaul are:

1) Backhaul is time-varying. Due to fading in the wireless channel, channel gains between a connector cell (CN) and a picocell vary in time.
2) No dedicated backhaul per picocell exists. The available backhaul capacity is shared among picocells.
3) Interference between picocells. Forwarding data to/from one picocell interferes with communication of other picocells.
4) The backhaul is constrained (i.e., it is not always unlimited compared to the rates in the access network).

SUMMARY OF EMBODIMENTS

Various embodiments provide for systems and methods of backhaul optimization. An exemplary system comprises a plurality of low power cells and a connector node. The connector node may be in communication with the plurality of low power cells. The connector node may be configured to receive demands from each of the plurality of low power cells. Each of the demands may indicate a demand at a predetermined time. The connector node may be further configured to determine a rate for each of the plurality of low power cells based on the demands of each of the low power cells and the assigned rate of the other of the plurality of low power cells. The connector node may be further configured to allocate capacity based on the determined rates.

In various embodiments, at least one of the low power cells is a picocell or a femtocell. The system may further comprise a core network wherein the connector node is in further communication with the core network. In some embodiments, each of the plurality of low power cells is configured to determine demand based on current demand and expected demand at the predetermined time. Each of the plurality of low power cells may be configured to determine demand based on a quality of service of one or more users of the low power cells.

In some embodiments, the connector node is configured to determine a difference between each of the demands from the plurality of low power cells and rates for each of the low power cells, sum the differences, and determine the assigned rates based on a minimum of the sum. The difference between at least one of the demands from the plurality of low power cells and at least one of the rates may be weighted.

A channel between the connector node and at least one of the plurality of low power cells may be near-line-of-sight. In some embodiments, the connector node changes the predetermined time based on an observed history of usage of the low power cells.

An exemplary method may comprise receiving demands, by a connector node from each of a plurality of low power cells, each of the demands indicating a demand at a predetermined time, determining, by the connector node, a rate for each of the plurality of low power cells based on the demands of each of the low power cells for the predetermined time as well as the assigned rate of the other of the plurality of low power cells, and allocating capacity, by the connector node, based on the determined rates.

An exemplary computer readable medium may comprise executable instructions. The instructions may be executable by a processor to perform a method. The method may comprise receiving demands, by a connector node from each of a plurality of low power cells, each of the demands indicating a demand at a predetermined time, determining, by the connector node, a rate for each of the plurality of low power cells based on the demands of each of the low power cells for the predetermined time as well as the assigned rate of the other of the plurality of low power cells, and allocating capacity, by the connector node, based on the determined rates

DETAILED DESCRIPTION OF VARIOUS EMBODIMENTS

Figure 1:
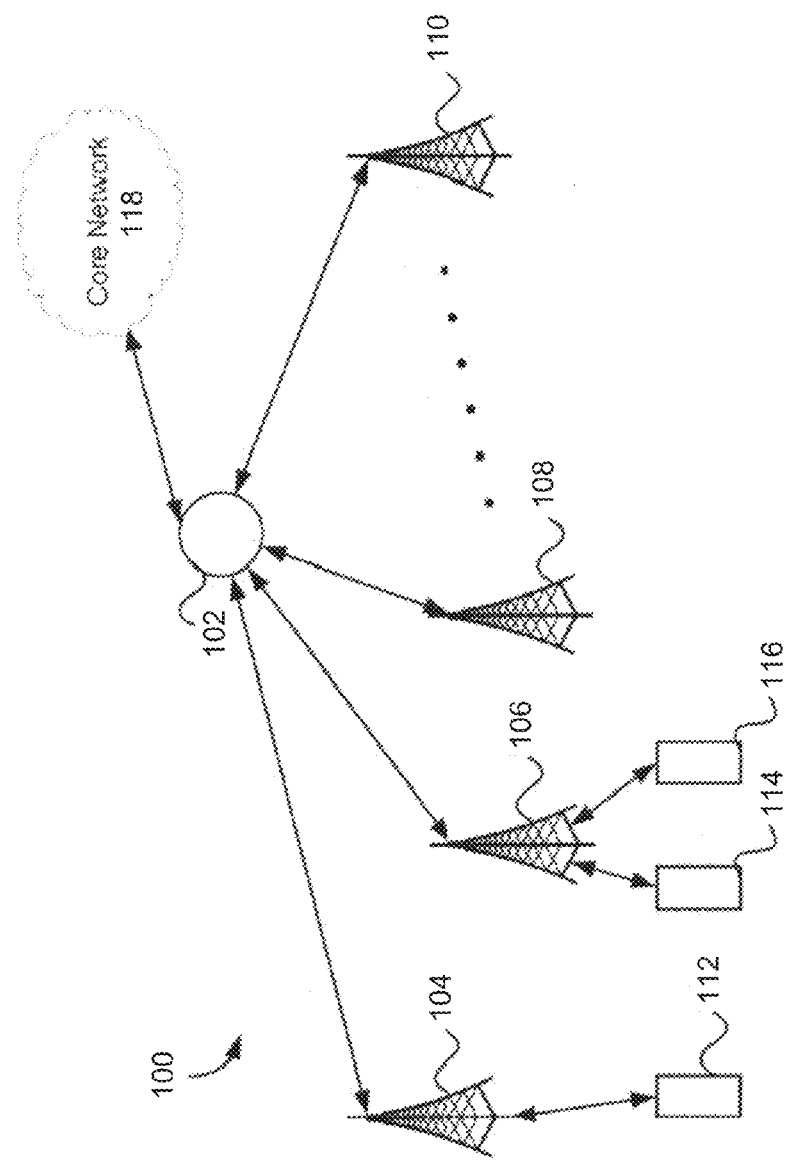
FIG. 1 shows the considered system in which a connector node (CN) provides the backhaul connection to a set of picocells in accordance with some embodiments.

One problem when the backhaul capacity is constrained is how to allocate this limited resource among picocells. Backhaul allocation may determine the rate and power allocation given to each picocell, as well as time/bandwidth allocation in case the transmission scheme does not transmit simultaneously to all users. An exemplary method in some embodiments may provide for optimally allocating available backhaul capacity among picocells to maximize the picocell utility. In various embodiments, backhaul allocation exploits characteristics of the backhaul wireless channel and also adapts to changes in user traffic at picocells.

In various embodiments, a method for optimization of wireless backhaul sharing in cellular networks where the backhaul capacity is limited is discussed. This situation occurs, for example, in cellular networks deploying low power (and hence, short coverage) base stations which may be referred to as picocells and femtocells (e.g., low power cells). The proposed backhaul sharing optimization can achieve different objectives as desired by the network operator including: maximum revenue, maximum throughput, fairness, prioritization of services in a picocell (i.e., quality-of-service (QoS)), and prioritization of picocells. The parameters may be collectively referred to as demands. Which of the objectives are achieved may depend on the utility metric that are described. The utility metric may also depend on the user traffic in each picocell and it may aim to maximize utilization of picocell/femtocell access network.

Some embodiments allow a wireless backhaul to be shared among picocells based on the demands as well as conditions of the underlying wireless channel between the connector node (CN) providing backhaul and the picocells/femtocells utilizing this backhaul. In various embodiments, an exemplary method to determine transmission parameters (e.g., transmission power and backhaul rate) if allocated for each picocell at the connector node. The optimal choice of power and rate allocation may depend on the utility metric. The parameters may be optimized such that picocell utility (which may depend on demands) may be maximized. The maximization may exploit the characteristics of the time-varying wireless channel between the CN and picocells to increase the total backhaul capacity. Furthermore, as the load in the access network changes, the backhaul may adapt to the time-varying load. Exemplary methods described herein may focus on communication from the CN to the picocells, but the same methodology may apply, in some embodiments, for the backhaul optimization to support the uplink traffic delivered from the picocells to the CN.

Some embodiments may apply for any physical layer transmission scheme deployed for communication between the connector node and picocells/femtocells. The transmission scheme, power allocation and the wireless channel conditions may determine the set of backhaul rates that can be delivered to picocells, referred to as the achievable rate region. These rates may be determined either theoretically or experimentally. Unlike in the dedicated backhaul case, their property is that, due to the shared wireless backhaul channel, there is a tradeoff between the backhaul rates allocated to different picocells. In some embodiments, the method may determine an operating point on the given achievable rate region by determining allocated powers and backhaul rates for picocells, based on the above demands. Instead of considering only the achievable rate region, the method in some embodiments apply more generally to consideration of the achievable region that captures rates, traffic delays, outage probabilities, etc.

The operating point may be obtained by optimization (minimization) of a properly designed cost function. Minimization of the cost function may result in the maximum utility of the picocells. The required property of the cost function may be that, if there exists an operating point in the achievable rate region at which the demands can be fully satisfied, that point is chosen as the operating point by the optimization. In this case, the backhaul capacity is not a constraint. Otherwise, the operating point obtained by optimization is on the boundary of the achievable region.

Some embodiments described herein describe single CN providing backhaul to a set of picocells. However, some embodiments may readily apply to a network scenario in which there is multiple CNs each providing backhaul to a different set of picocells. All CNs may operate in the same bandwidth. Thus, this setting may capture the impact of interference introduced by a CN at the picocells that are served by other CNs. The effect of interference may be captured in the achievable rate region. The achievable rate region may characterize a set of backhaul rates that can be delivered at all picocells in the network. Again, based on demands for all picocells, an operating point on the region may be determined, thereby determining powers and rates that CNs need to allocate to picocells they serve.

Some embodiments may be used to determine an optimal sharing of available spectrum between the downlink and uplink backhaul traffic, based on their traffic and demands. To accommodate changing demands in the access network, some embodiments re-allocate backhaul in every time interval $T_{CN}$ or at different time interval $T_{CN}$. The cost function may depend on users' traffic in each picocell and their targeted QoS, in the next time interval. The traffic demand for a picocell for the next $T_{CN}$ may be estimated based on these values. The CN may obtain this estimate from picocells at the beginning of each interval $T_{CN}$. The traffic demand may also depend on the anticipated number of newly admitted users in the next time interval, and the anticipated number of terminated calls and services. These values may be estimated, for example, based on the history of traffic and depending on the time of the day/week.

In various embodiments, the policy decisions about the allocated QoS for each session of each subscriber may be determined by the Policy and Charging Rules Function (PCRF) that makes session-level policy decisions. The PCRF may provide these decisions to the Policy and Charging Enforcement Function (PCEF) located in the packet data network gateway (PDN GW), as well as to the bearer-binding and event-reporting function (BBERF). Location of the BBERF may depend on the access technology used. Thus, PCRF, PERF, and BBERF may have the information related to the traffic demands and needed for the proposed backhaul optimization that depends on QoS. In various embodiments, this information is provided to the picocells from PCRF in the form of total rate, delay, etc. required for each QoS class in each picocell (calculated either by a picocell or by PCRF). This information may not necessarily equal the actual traffic that arrives at the Serving Gateway (GW) to be forwarded to the picocell. Hence, communication with the serving GW can provide more precise information about the actual incoming downlink traffic. The picocell may use both information from PCRF and the Serving GW in order to obtain a traffic estimate that may be used in the optimization. This estimate may be then sent to the CN to be incorporated into the cost function. For the uplink traffic, information about the number of users and their QoS may be directly known at a picocell, which forwards this information to the CN.

Some embodiments apply to networks in which the backhaul is provided over a wireless channel simultaneously to several base stations (e.g., low power base stations such as picocells or femtocells). Those skilled in the art will appreciate that some embodiments described herein may apply to microwave backhauls, backhauls with wireless nodes, cellular networks (e.g., 3G networks, 4G networks, LTE, WiMAX and Wi-Fi) and the like.

In one example, we consider a wireless network consisting of N picocells, as shown in FIG. 1. FIG. 1 shows the considered system 100 in which a connector node (CN) 102 provides the backhaul connection to a set of picocells 104, 106, 108, and 110 in accordance with some embodiments. FIG. 1 depicts a picocell network with the CN 102 providing backhaul connection to the core network 118.

The CN 102 may be any device configured to communicate with any number of digital devices such as base stations. A digital device is any device with a processor or memory. For example, the CN 102 may comprise one or more antennas configured to communicate with other nodes or cells such as picocells, macrocells, femtocells, or any other device. The cells may be low power cells. Those skilled in the art will appreciate that, in some embodiments, the nodes in communication with the CN 102 may be any combination of picocells, macrocells, femtocells, and/or any other device. For the purposes of describing FIG. 1, the CN 102 is depicted as communicating with picocells 104, 106, 108, and 110.

Each picocell may communicate with one or more digital devices such as mobile devices 112, 114, and 116. The mobile devices may be any mobile customer equipment, cellular communications devices, or the like. The core network 118 is any network that may communicate with one or more other digital devices such as another connector node, network device (e.g., router or switch), Internet, or any other digital device In FIG. 1, the backhaul to the picocells is provided by the CN 102 which communicates to picocells 104, 106, 108, and 110 over one or more wireless channels. Attached to each picocell 104, 106, 108, and 110 may be a wireless transceiver for backhaul communication. Both the CN 102 and the picocells 104, 106, 108, and 110 may be equipped with one or more antennas for backhaul communication. The number of antennas at the CN 102 is denoted by M and the number of antennas at each picocell (e.g., picocell 104) is denoted by R. The channel can be line-of-sight or, typically, near-line-of-sight or non-line-of-sight. In the following exemplary embodiment, the focus will be on the communication from the CN 102 to the picocells 104, 106, 108, and 110, but the proposed methodology of at least some embodiments described herein apply to both communication directions (i.e., from/to the CN 102 to/from the picocells 104, 106, 108, and 110). Each picocell may communicate with one or more mobile users 112.

The received signal $y_i$ at picocell i (e.g., picocell 102) may be modeled as:

$$y_i = H_i x + z_i \quad (1)$$

where $y_i \in C^{R \times 1}$, the transmitted signal at the CN 102 is $x \in C^{M \times 1}$, and the random channel gain matrix from the CN 102 to picocell i is $H_i \in C^{R \times M}$. Receiver noise $z_i \in C^{R \times 1}$ has i.i.d. components with zero mean and variance N. A block fading channel may be considered where channel gains are constant over the length of one code-block. In some embodiments, we assume that the channel gain matrices are known at the CN 102, which has an average transmit power constraint P.

In various embodiments, a method may apply for any physical layer transmission scheme deployed over the backhaul wireless channel (1) to deliver data to picocells 104, 106, 108, and 110. Channel (1) may be identical to the Gaussian MIMO broadcast channel or equivalently the downlink channel of a MIMO cellular system with no intra-cell interference. Optimal and suboptimal transmission schemes for this channel may include but are not limited to: dirty paper coding, superposition coding, beamforming and TDMA/FDMA transmission with or without channel dependent scheduling.

In the presence of fading, maximizing the sum throughput may be achieved by a simple TDMA approach in which, in each block, the transmitter may send data only to the user with the best channel gain, in that way exploiting multiuser diversity. The choice of a particular transmission scheme may determine the set of rates that can be simultaneously or near simultaneously delivered to a plurality of picocells. An achievable set of rates is referred to as an achievable rate region for that transmission scheme. The set of achievable rates for a specific scheme is denoted as C(P).

The choice of an operating point on the achievable rate region C(P) may be done based on the network performance objective desired to be achieved. Such objectives include, without limitation: maximum revenue, maximum throughput, fairness, prioritization of services in a picocell (e.g., quality-of-service (QoS)) and prioritization of picocells. Optimization may be done by introducing a defined metric that captures desired objectives. The utility metric may also depend on user traffic in each picocell. Transmit powers and backhaul rates of each picocell may be determined such that picocell utility is maximized. This maximization may exploit multiuser diversity to increase the total backhaul capacity. Furthermore, as the load in the access network changes, the backhaul may adapt to the time-varying load.

In various embodiments, we choose a specific utility metric that depends on the user traffic in the picocell.

A. Backhaul Allocation for Picocells

Dynamics in the considered network may vary on two different time scales:

1) Short time changes (due to fading)
2) Long term changes (due to load change, weather).

The CN 102 may allocate backhaul resources to track long term changes. We introduce time interval $T_{CN}$ and may readjust the backhaul allocation every $T_{CN}$. The $T_{CN}$ is a predetermined time interval and may be chosen based on observed history such as dynamics of the traffic change (e.g., rush hour, weekend, etc.). Those skilled in the art will appreciate that the $T_{CN}$ may be changed due to other conditions (e.g., weather change, emergency, special events).

A backhaul rate allocated to picocell i is denoted $R_i(t)$. The demand for backhaul at each time interval $T_{CN}$ at a picocell i is denoted $D_i(t)$. A value of $D_i(t)$ is determined by picocell i based on the current load of the picocell, anticipated load in the next $T_{CN}$ interval, QoS for each user, and interference from other picocells. A picocell (e.g., picocell 102) may report a value of $D_i(t)$ every $T_{CN}$ (e.g., every $T_{CN}$ seconds). We consider a solution in one time interval, and therefore, we can drop index t to simplify notation.

The chosen transmission scheme determines C(p) and is thus may be known to the CN 102. After obtaining values of $D_i$, i=1, ..., N from picocells (e.g., picocells 104, 106, 108, and 110), CN 102 may choose transmit powers and rates for the next interval $T_{CN}$ as follows. The picocell utility may be maximized based on a cost function that is inversely related to utility (maximum utility corresponds to minimum cost). The cost function may satisfy the following:

The cost function is non-increasing in assigned rate to a picocell.

If $(D_1, \ldots, D_N) \in C(P)$ then $(R_1^*, \ldots, R_N^*) = (D_1 \ldots, D_N)$. Otherwise, an optimal solution is on the boundary of the achievable rate region, C(P).

Based on the above, the optimization problem may be formulated as:

$$\min \sum_{i=1}^{N} w_i g_i(D_i, R_i) \quad (2)$$

subject to $(R_1, \ldots, R_N) \in C(P)$ where $$g(D, R) = (D - R)_+^p \quad (3)$$

and $x_+ = \max\{0, x\}$, $w_i$ is the weight assigned to the cost function of cell i, and $p \geq 0$. We denote the demand point as $D = (D_1, \ldots, D_N)$ and an achievable rate point as $R = (R_1, \ldots, R_N)$.

An alternate algorithm may be formulated by defining a simpler optimization problem, as follows:

$$\min \sum_{i=1}^{N} w_i g_i(D_i, R_i) \quad (4)$$

subject to $(R_1, \ldots, R_N) \in C(P)$ where $g(D, R) = (D - R)^p \quad (5)$

Under certain, quite non-restrictive conditions, the optimization (4) may be shown to yield the optimal solution to (2).

The two algorithms thus differ only in cost functions (3) and (5). It may be observed that when $D \in C(P)$, the cost function in (4) evaluated in D is zero and thus an optimal solution is D. In other words, if the demand vector is within the achievable rate region, the cost is zero and the backhaul is not a constraint. Otherwise, a solution to (4) may be a set of rates $(R_1^*, \ldots, R_N^*)$ on the boundary of C(P). The optimal solution determines the specific point in region C(P) and thus determines the power allocation that achieves this point, and that the CN 102 should use.

Figure 2:
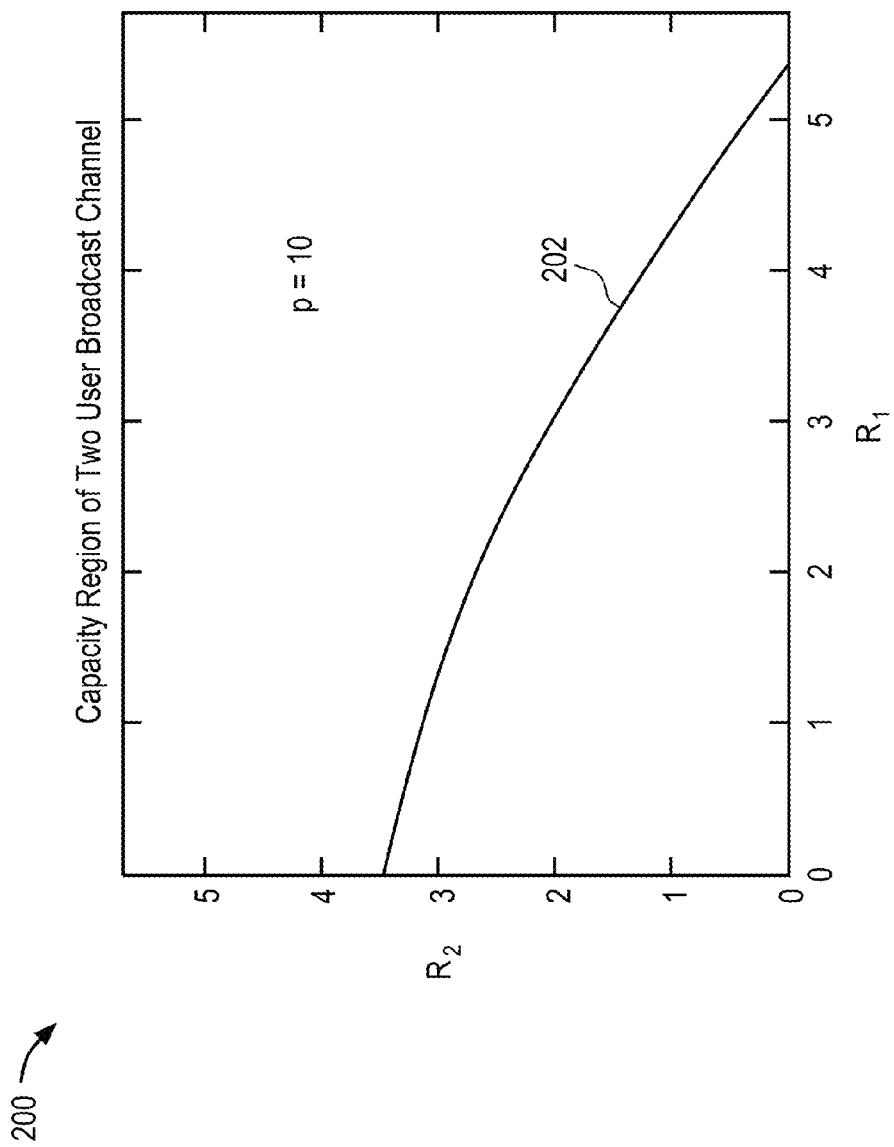
FIG. 2 illustrates a typical rate region that can be achieved over a wireless backhaul channel at two picocells in accordance with some embodiments.
Figure 3:
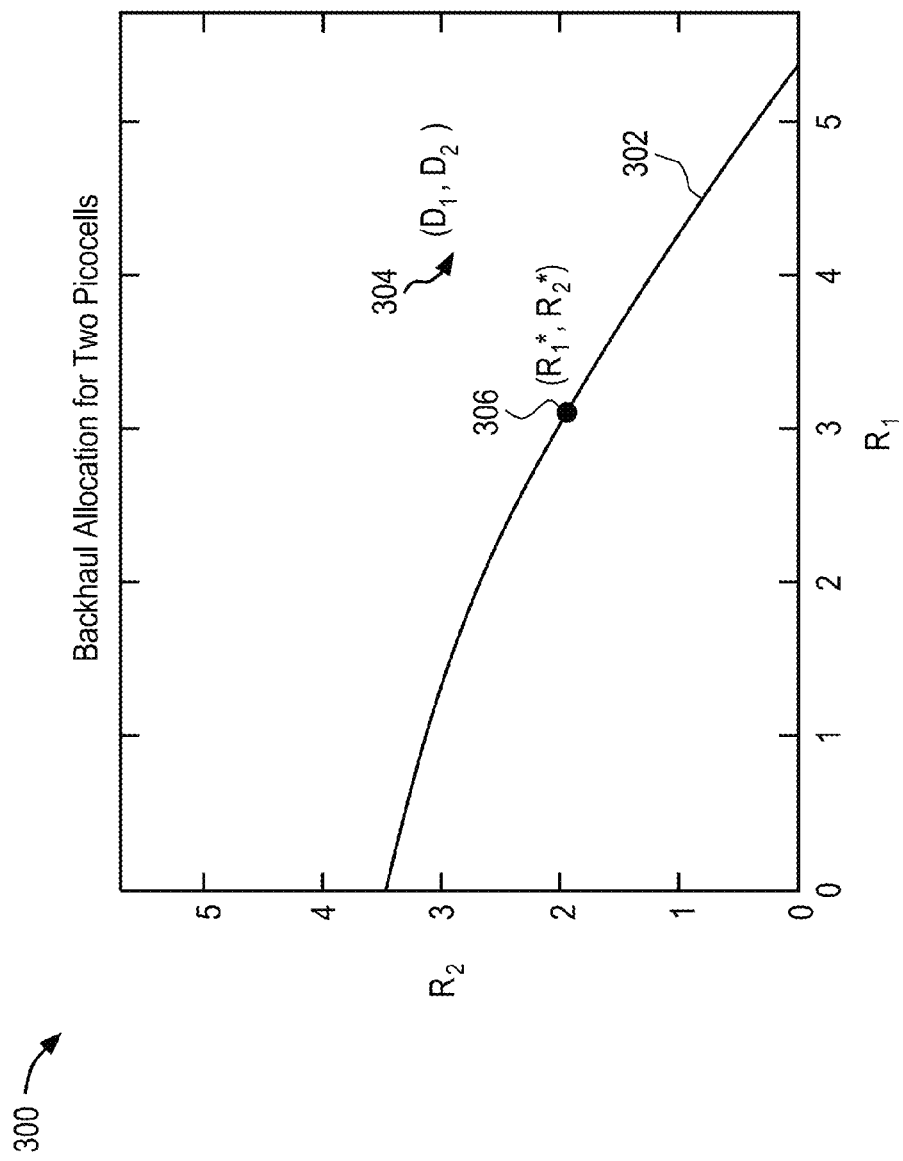
FIG. 3 shows a solution to the backhaul allocation problem for specific values of traffic demands at two picocells, denoted $(D_1, D_2)$ for the case of the achievable rate region of FIG. 1 in accordance with some embodiments.

Consider next the case p=2, $w_i$=1, for all i. In this case, the cost function minimizes the squared distance between the demand point D and a rate point R in the achievable rate region C(p). For the broadcast channel of FIG. 2, the solution of (4) is shown in FIG. 3 for a specific choice of demands $(D_1, D_2)$. FIG. 2 illustrates a typical rate region that can be achieved over a wireless backhaul channel with two picocells in accordance with some embodiments. The typical rate region is bounded by boundary 202. FIG. 2 depicts a capacity region 200 of a two user broadcast channel with p=10.

FIG. 3 shows a solution 300 to the backhaul allocation problem for specific values of traffic demands at two picocells, denoted $(D_1, D_2)$ at point 304 for the case of the achievable rate region of FIG. 1 in accordance with some embodiments. Optimal rates are denoted $(R_1^*, R_2^*)$ at point 306 and are on the boundary 302 of the achievable rate region. In the example of FIG. 3, backhaul allocation is depicted for two picocells with demands $D_1=4$, $D_2=3$. The closest point along the boundary 302 of available rates (i.e., backhaul allocation) is the point closest to $(D_1, D_2)$ 304 (e.g., (3, 4)) which is point 306 $(R_1^*, R_2^*)$.

Hence the allocation (2) performs the following:

At each time interval $T_{CN}$, if $D_i \in C(P)$ the solution assigns $R_i^* = D_i$. Otherwise: it chooses $(P_1, \ldots, P_N)$ such that $(R_1^*, \ldots, R_N^*) \in C(P)$ and $R^*$ is the closest point to D on the capacity region boundary.

Figure 4:
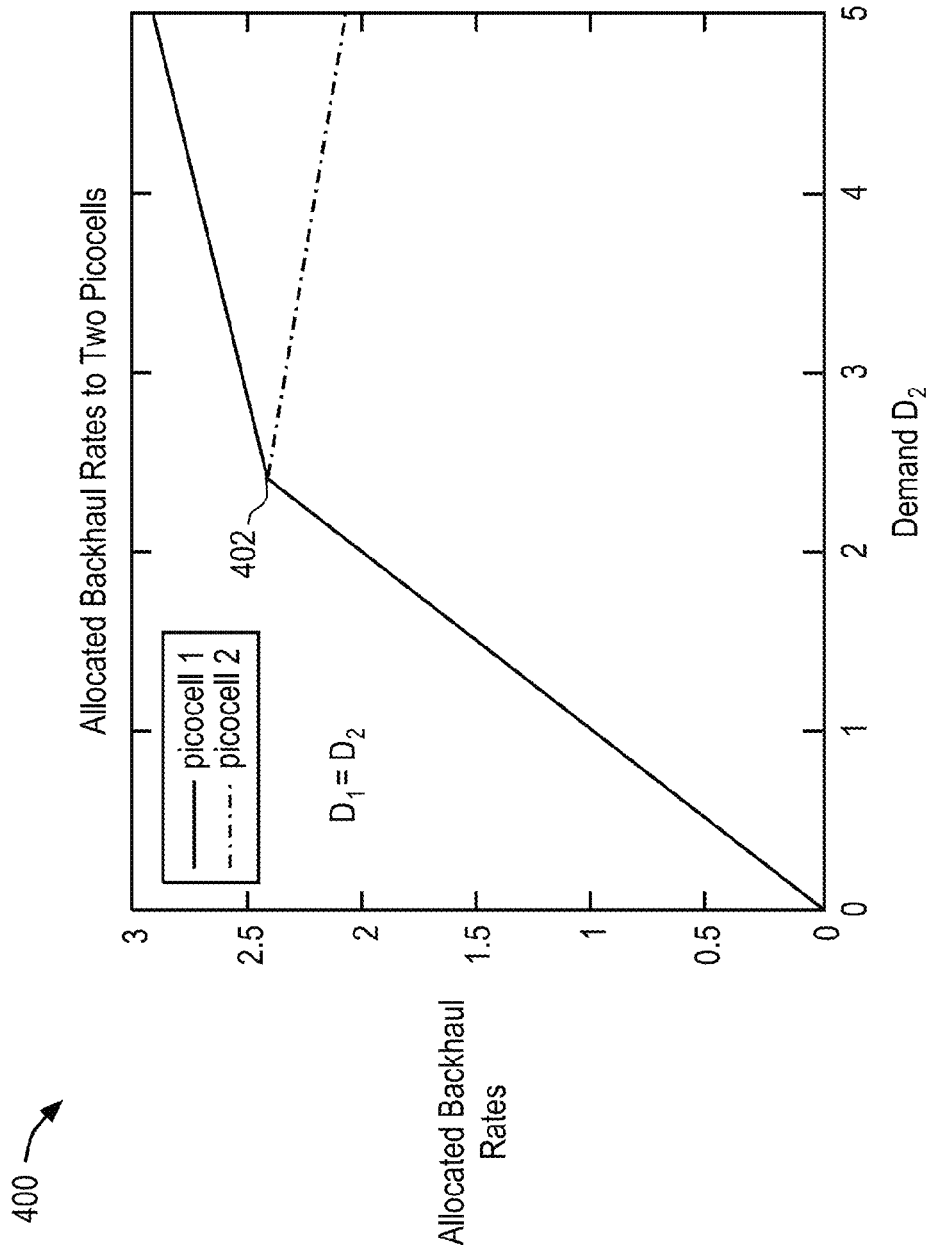
FIG. 4 presents allocated backhaul rates to two picocells as a function of their demands ($D_1$, $D_2$), for the achievable rate region of FIG. 1 in accordance with some embodiments.

FIG. 4 presents allocated backhaul rates 400 to two picocells as a function of their demands $(D_1, D_2)$, for the achievable rate region of FIG. 1 in accordance with some embodiments. In this figure, demands are chosen so that $D_1=D_2$. It may be observed that for small values of $D_1$ and $D_2$ when $(D_1, D_2) \in C(P)$, the allocated rates equal the demand, i.e., $(R_1^*, R_2^*) = (D_1, D_2)$. As $D_1$ and $D_2$ increase, the allocated rates cannot match demand anymore at point 402. Picocell 2 is penalized more than picocell 1 because the channel to picocell 1 is better than to picocell 2 (this can be observed from FIG. 2). Thus, the allocation (4) assigns rates based on both demands and wireless channel characteristics, as was our goal.

We also allow for different values of p (the penalty parameter). This enables the algorithm to control the penalty based on demand. For example, for larger values of p, picocells with higher demand may be penalized more, and vice versa. This ensures some level of fairness in resource allocation. If no demands are reported by picocells in interval $T_{CN}$, the backhaul can be chosen: to maximize total capacity, equal for all picocells, based on the classes of picocells, etc.

Instead of metrics presented in (2) and (4), other metrics can be considered such as: 1) min max |D−R|, 2) maximizing picocell rates such that all picocells satisfy a minimum rate requirement, 3) minimizing the number of picocells whose rate requirements are not met, etc. The next section proposes an approach based on a metric that performs backhaul optimization for a group of picocells in a region.

Figure 5:
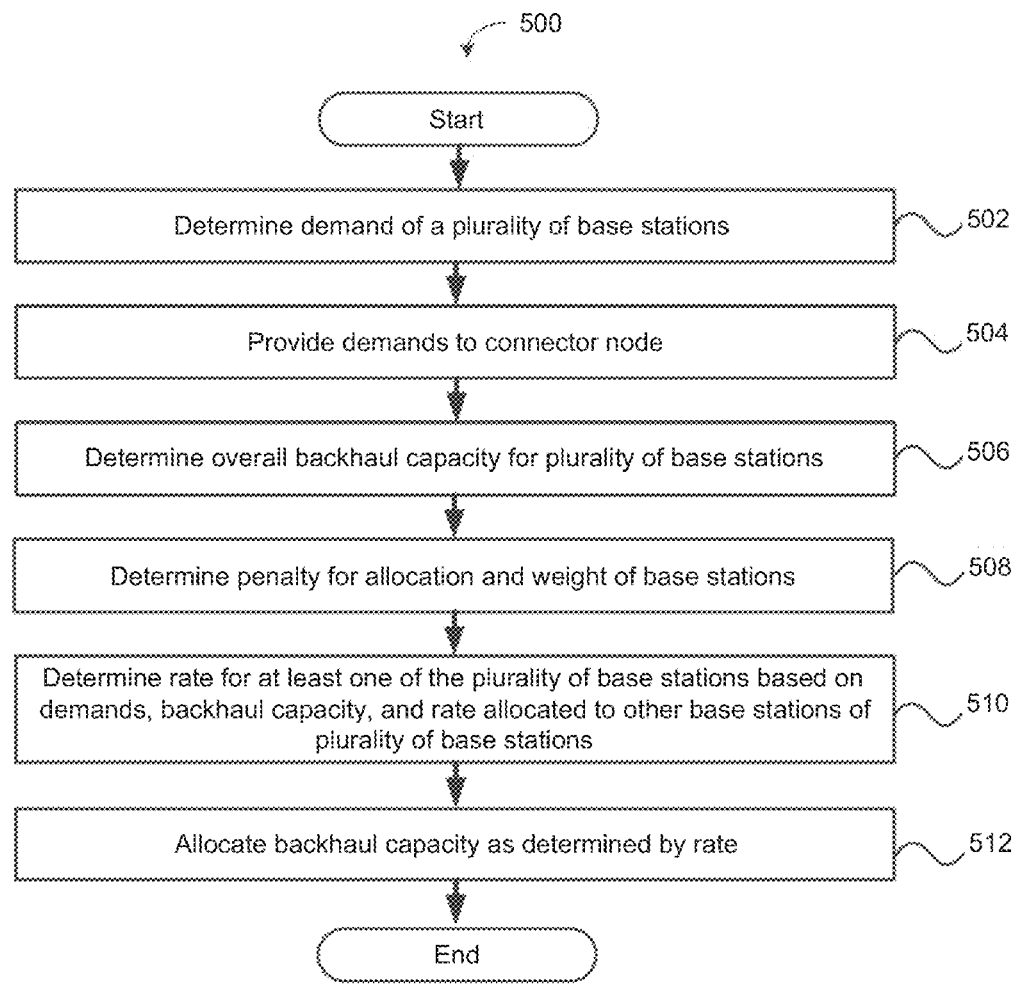
FIG. 5 is a flowchart of a method of allocation of backhaul capacity according to some embodiments.

FIG. 5 is a flowchart 500 of a method of allocation of backhaul capacity according to some embodiments. In step 502, each of a plurality of base stations determines demand. Demand may be based on current demands by one or more users and expected demand for a predetermined time (e.g., $T_{CN}$). Demand may also be based on interference between base stations and/or quality of service (QoS) for one or more users. The base stations may be any digital device such as a picocell or femtocell.

In step 504, each base station provides the determined demands to the connector node over a wireless network. In some embodiments, each base station comprises a module that determines demands and/or provides the demands to the connector node. The module may be any hardware or software. In some embodiments, the base station may comprise a processor, memory, and computer readable medium that stores executable instructions. The computer readable medium is any medium, such as a hard drive, compact disk, solid state drive, or the like configured to store data. The computer readable medium may be nontransitory. The instructions may be executable by a processor to determine demand and provide the demand to the connector node. In some embodiments, the connector node requests demands from one or more base stations. In various embodiments, the base stations provide the demands to the connector node without waiting for a request.

In some embodiments, the demand provided by the base stations to the connector node represents a single value for each base station. In other embodiments, the demand provided by each base station may include additional information such as quality of service demands or other information.

In step 506, the overall backhaul capacity for the plurality of base stations is determined. The overall backhaul capacity may be determined based on past communication between any number of base stations and the central node. The overall backhaul capacity may be based, in part, on the effects of weather on the rate of service between one or more base stations and the central node, events, time of day, time of year, or the like. The determination of backhaul capacity may be updated at any time to take into account current conditions (e.g., availability of base stations, extreme weather, or the like).

In step 508, penalties for allocation of resources and weight for each base station may be determined. Allocation of resources may be represented by exponent p in equations 3 and 5. The penalty parameter p may be selected based on the difference between demand and available rates for a base station. The penalty parameter may be different for different base stations and/or may be updated at any time.

The weight per base station may be represented by exponent w in equations 3 and 5. Any number of base stations may have the same or different weights. The determination of a weight may be influenced based on QoS of one or more users or dataflows associated with the base station or any other base station.

In step 510, a rate for each base station is determined. The rate for a base station may be based on demands of a plurality of base stations, backhaul capacity, and the rates allocated to other base stations of the plurality of base stations. In one example, a summation is generated based on all base stations. For each base station, assuming demand is greater than available rate, the difference between demand and a rate to be determined is identified and the difference penalized by the penalty parameter (exponent p) (e.g., see equation 5). Each penalized difference is multiplied by a weight for the associated base station (e.g., see w in equation 4). The results are added together to create an equation with a set of unknown rates (i.e., one unknown rate for each base station). A minimum is used to determine the optimal result (e.g., shortest distance between an available rate(s) and demand(s)) to determine rates for each of the base stations.

In step 512, the CN node allocates backhaul capacity based on the determined rate.

In various embodiments, the CN node, like the base station, may comprise one or more modules to perform one or more functions. The modules may be hardware or software. In various embodiments, the CN node comprises a processor, memory, and a computer readable medium comprising executable instructions to perform all or some of the steps in FIG. 5.

B. Backhaul Allocation Over Regions

Some embodiments may be generalized to allow optimization of the total backhaul allocated to several picocells. This generalization may be referred to as backhaul allocation over regions. After the backhaul rate and power allocation have been performed at the CN, there may be a set of picocells for which the demand has not been met (i.e., $R_i < D_i$). These picocells may not be able to support their users nor admit new ones. Hence, the picocells may attempt to handoff some of their users to the neighboring cells. Based on demands and channel conditions, the backhaul allocation may result in a scenario in which the demand was not met for a group of neighboring picocells without handoffs or alternatives.

We denote the set of all picocells $\{1, \ldots, N\}$ as V. We let $S_i \subset V$ denote a subset of V and consider $\{S_1, \ldots, S_M\}$ for some M>0. For backhaul allocation, we then consider the following generalization of problem (2):

$$\min \sum_{a=1}^{M} w_a g(D_a, R_a) \quad (6)$$

$$\text{subject to } (R_1, \ldots, R_N) \in C(P)$$

$$R_a = \sum_{i \in S_a} R_i$$

where g(D, R) is given by (3).

Figure 6:
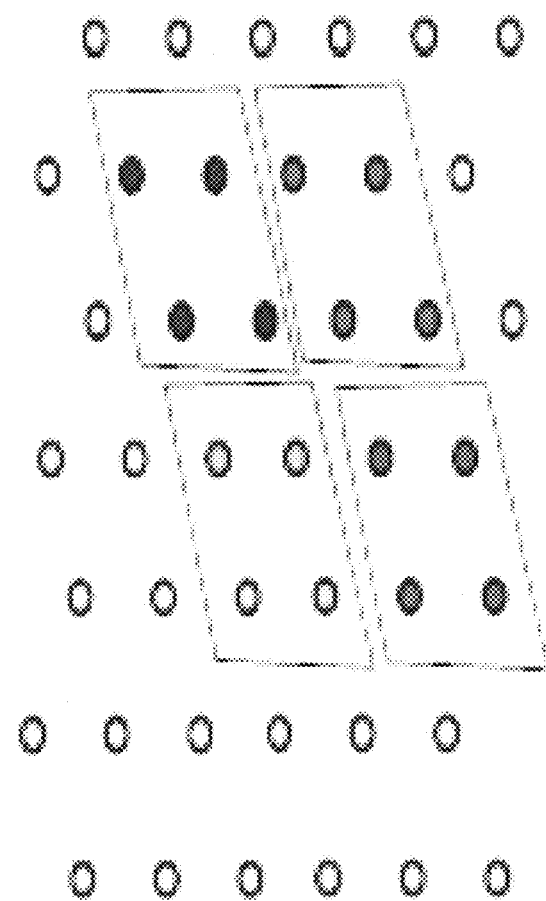
FIG. 6 shows a network of picocells grouped over regions in accordance with some embodiments.

$R_a$ is the sum backhaul rate allocated to the set of picocells $S_a$. We choose $S_a$ depending on the size and shape of regions over which we want to jointly allocate backhaul: for M=N, $S_1=\{1\}, S_2=\{2\}, \ldots, S_N=\{N\}$, problem (6) reduces to (2). More generally, to avoid backhaul allocation that does not meet demand in a certain region, we can choose $S_a$ to be a set of neighboring nodes. The solution determines the sum rate $R_a$ for the set $S_a$. An example is shown in FIG. 6. FIG. 6 shows a network of picocells grouped over regions in accordance with some embodiments. In this example, there are four neighboring cells in each region. The proposed broadcast allocation approach is also generalized to allow backhaul optimization over regions.

In addition to long term changes, the assigned backhaul capacity experiences fast variations due to fading within each interval $T_{TN}$. We point out that a network may not attempt to adapt to these changes. These changes may be handled by the physical layer transmission scheme and are therefore already taken into account in the achievable rate region C(P).

C. Generalization to Other Scenarios

Allocation of backhaul delivered for the downlink of the cellular system has been discussed regarding some embodiments herein. Backhaul can also be optimized when delivering uplink traffic from picocells to the CN. The channel from picocells to the CN is a multiple-access channel (MAC), and the optimal power allocation in fading is known. In a dual manner to the broadcast channel, for the fading MAC, multiuser diversity maximizes the total throughput. A similar methodology for the backhaul allocation for traffic from picocells to the CN may be applied. In this case, a solution to the optimization of backhaul allocation may determine transmit powers at picocells as well as the backhaul capacity available for each of them.

Furthermore, some embodiments described herein may be used to determine the optimal sharing of available spectrum between the downlink and uplink backhaul traffic, based on their traffic and demands. Furthermore, some embodiments may readily apply to a network scenario in which there are multiple CNs each providing backhaul to a different set of picocells. In some embodiments, all CNs may operate in the same bandwidth. Thus, this setting captures the impact of interference introduced by a CN at the picocells that are served by other CNs. In at least one approach, the effect of interference may be captured in the achievable rate region. The achievable rate region may characterize a set of backhaul rates that may be delivered at all picocells in the network. It may also capture the interference management scheme deployed at the CN. Again, based on demands for all picocells, an operating point on the region may be determined, thereby determining powers and rates that CNs may need to allocate to picocells they serve.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A system comprising:
   a plurality of low power cells; and
   a connector node in communication with the plurality of low power cells, the connector node configured to:
      receive a set of demands from each one of the plurality of low power cells, each one of the set of demands being reported by and indicating a desired parameter for one of the plurality of low power cells at a predetermined time;
      determine a particular backhaul rate for each of the plurality of low power cells based on the set of demands received and a set of assigned backhaul rates associated with the plurality of low power cells; and
      allocate capacity based on the particular backhaul rates.

2. The system of claim 1, wherein at least one of the plurality of low power cells is a picocell.

3. The system of claim 1, wherein at least one of the plurality of low power cells is a femtocell.

4. The system of claim 1, further comprising a core network wherein the connector node is in further communication with the core network.

5. The system of claim 1, wherein each of the plurality of low power cells is configured to determine a given demand based on a current demand and an expected demand at the predetermined time.

6. The system of claim 1, wherein each of the plurality of low power cells is configured to determine a given demand based on a quality of service of one or more users of the low power cells.

7. The system of claim 1, wherein the connector node configured to determine the particular backhaul rate for each of the plurality of low power cells comprises the connector node configured to determine a difference between each of the set of demands and each of the set of assigned backhaul rates, sum the differences, and determine the particular backhaul rates based on a minimum of the sum.

8. The system of claim 7, wherein the difference between at least one of the set of demands from the plurality of low power cells and at least one of the set of assigned backhaul rates is weighted.

9. The system of claim 1, wherein a channel between the connector node and at least one of the plurality of low power cells is near-line-of-sight.

10. The system of claim 1, wherein the connector node changes the predetermined time based on an observed history of usage of the low power cells.

11. A method comprising:
    receiving a set of demands, by a connector node from each of a plurality of low power cells, each one of the set of demands being reported by and indicating a desired parameter for one of the plurality of low power cells at a predetermined time;
    determining, by the connector node, a particular backhaul rate for each of the plurality of low power cells based on the set of demands received and a set of assigned backhaul rates associated with the plurality of low power cells; and
    allocating capacity, by the connector node, based on the particular backhaul rates.

12. The method of claim 11, wherein at least one of the plurality of low power cells is a picocell.

13. The method of claim 11, wherein at least one of the plurality of low power cells is a femtocell.

14. The method of claim 11, further comprising passing information, by the connector node, from at least one of the plurality of low power cells to a core network.

15. The method of claim 11, further comprising determining, by each of the plurality of low power cells, a given demand based on a current demand and an expected demand at the predetermined time.

16. The method of claim 11, further comprising determining, by each of the plurality of low power cells, a given demand based on a quality of service of one or more users of the low power cells.

17. The method of claim 11, wherein the determining, by the connector node, the particular backhaul rate for each of the plurality of low power cells comprises determining a difference between each of the set of demands and each of the set of assigned backhaul rates, summing the differences, and determining the particular backhaul rates based on a minimum of the sum.

18. The method of claim 17, wherein the difference between at least one of the set of demands from the plurality of low power cells and at least one of the set of assigned backhaul rates is weighted.

19. The method of claim 11, wherein a channel between the connector node and at least one of the plurality of low power cells is near-line-of-sight.

20. The method of claim 11, further comprising changing, by the connector node, the predetermined time based on an observed history of usage of the low power cells.

21. A non-transitory computer readable media configured to store executable instructions, the instructions being executable by a processor to perform a method, the method comprising:
    receiving a set of demands, by a connector node from each of a plurality of low power cells, each one of the set of demands being reported by and indicating a desired parameter for one of the plurality of low power cells at a predetermined time;
    determining, by the connector node, a particular backhaul rate for each of the plurality of low power cells based on the set of demands received and a set of assigned backhaul rates associated with the plurality of low power cells; and
    allocating capacity, by the connector node, based on the particular backhaul rates.

* * * * *